United States Patent [19]

Pfeifer

[11] 4,251,729
[45] * Feb. 17, 1981

[54] X-RAY DIAGNOSTIC INSTALLATION FOR X-RAY PHOTOGRAPHS

[75] Inventor: Rolf Pfeifer, Erlangen, Fed. Rep. of Germany

[73] Assignee: Siemens Aktiengesellschaft, Berlin & Munich, Fed. Rep. of Germany

[ * ] Notice: The portion of the term of this patent subsequent to Jan. 30, 1996, has been disclaimed.

[21] Appl. No.: 9,070

[22] Filed: Feb. 5, 1979

[30] Foreign Application Priority Data

Mar. 3, 1978 [DE] Fed. Rep. of Germany ....... 2809336

[51] Int. Cl.³ .............................................. H05G 1/00
[52] U.S. Cl. ................................. 250/402; 250/416 R
[58] Field of Search ............... 250/401, 402, 403, 404, 250/405, 416, 320, 322, 323; 340/752, 766, 782, 798, 799

[56] References Cited

U.S. PATENT DOCUMENTS

| | | | |
|---|---|---|---|
| 3,916,192 | 10/1975 | Schmittmann et al. | 250/322 |
| 3,999,044 | 12/1976 | Grim | 250/401 |
| 4,075,621 | 2/1978 | Salman | 340/799 |
| 4,137,571 | 1/1979 | Pfeifer | 250/320 |

Primary Examiner—Alfred E. Smith
Assistant Examiner—Thomas P. O'Hara
Attorney, Agent, or Firm—Hill, Van Santen, Steadman, Chiara & Simpson

[57] ABSTRACT

An electronic read-only memory is provided for each photographic program whose input is connected to a resettable pulse counter which is actuatable step-by-step via a clock pulse generator and which memory delivers program signals predetermined by its program that correspond to the output signals of the pulse counter. The outputs of all read-only memories are connected to the component parts they control via a program selector circuit. A display matrix for displaying the content of the read-only memories is provided, which display matrix is connected at the output of the program selector circuit and whose display is synchronized by means of the clock pulse generator operating at a sufficiently high rate that the entire program can be observed at one time.

4 Claims, 2 Drawing Figures

X-RAY DIAGNOSTIC INSTALLATION FOR X-RAY PHOTOGRAPHS

BACKGROUND OF THE INVENTION

The invention relates to an x-ray diagnostic installation for x-ray photographs comprising a program control device for the photographic cycle which contains an electronic read-only memory for each photographic program whose address input is connected to a resettable pulse counter which is actuatable step-by-step by means of a clock pulse generator and which memory delivers program signals predetermined by its program that correspond to the output signals of the pulse counter, and wherein the outputs of all read-only memories are connected to the component parts they control via a program selector circuit.

In such an x-ray diagnostic installation, the storage of the photographic programs ensues purely electronically. Thus, no scanning of mechanical program memories, for example, data cards, is necessary and the operational dependability is very high. The program selection can ensue by means of pushbuttons. Because of the use of electronic read-only memories, it is possible to conduct a program trial run, wherein for example the values and magnitudes respectively predetermined are optically indicated.

SUMMARY OF THE INVENTION

The object underlying the invention is to design an x-ray diagnostic installation of the type initially cited in such manner that a display of the contents of the read-only memories, i.e., a display of the magnitudes engaged or to be engaged, respectively, by means of the selected program, ensues for the user.

This object is inventively achieved in that display means for the content of the read-only memories are provided, which display means are connected to the output of the program selector circuit and whose display is synchronized by means of the pulse generator. In the inventive x-ray diagnostic installation, the output signals of the respectively selected read-only memory are optionally displayed, so that a simple examination of the selected photographic program is possible. It is particularly practical if the pulse generator is switchable to a pulse frequency which produces a simultaneous display of the complete contents of the respectively selected read-only memory for the eye of the user. Although, in this further development of the invention, a sequential display of the magnitudes engaged for the individual program steps ensues, because of the rapid stepping of the pulse generator the user can none the less apprehend the entire contents of the selected read-only memory at one glance.

Further advantages and details of the invention derive from the further subclaims.

In the following, the invention is explained in greater detail on the basis of a sample embodiment illustrated in the drawing; and other objects, features and advantages will be apparent from this detailed disclosure and from the appended claims.

DETAILED DESCRIPTION

Figure 1:
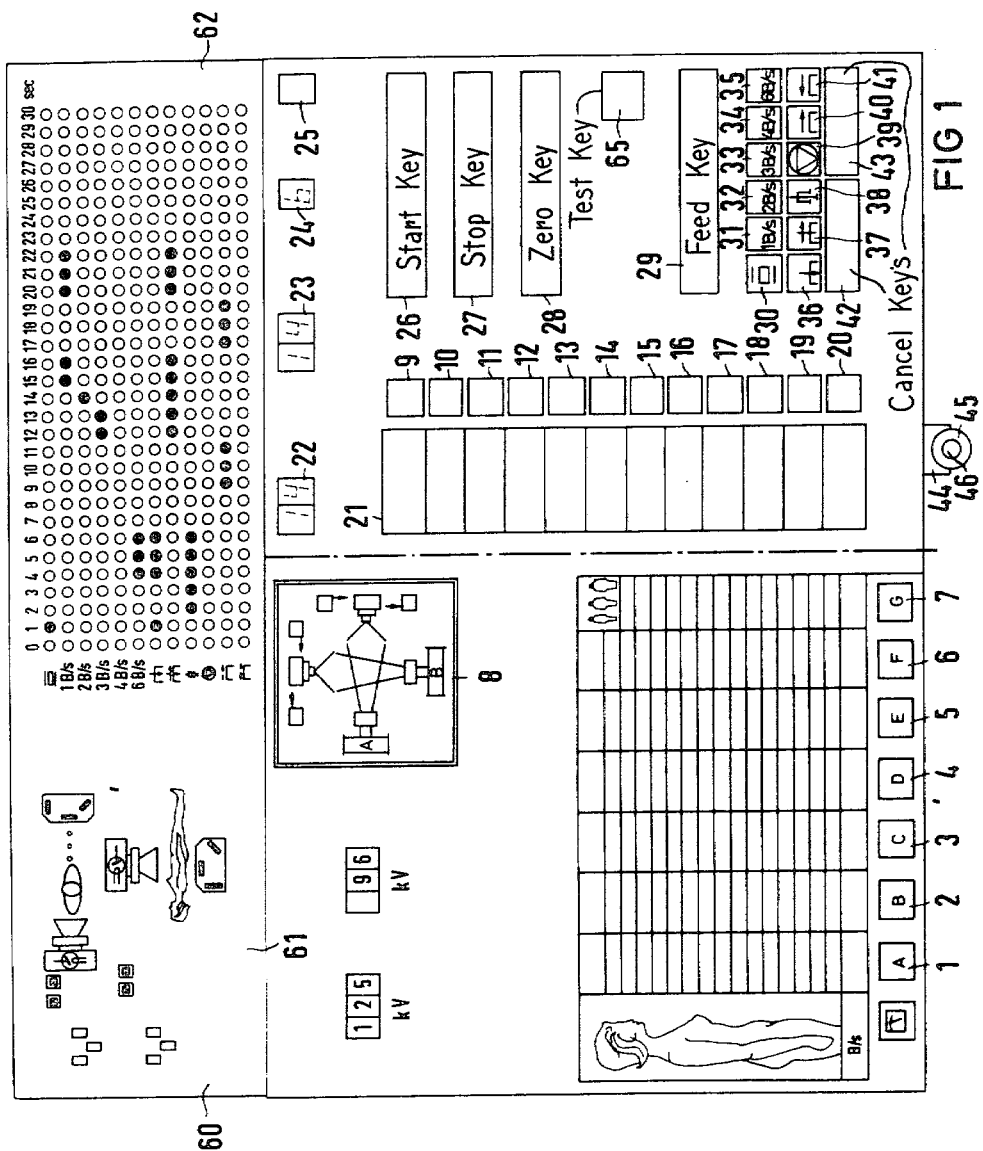
FIG. 1 is a view of an operating desk of an x-ray diagnostic illustration according to the invention.

The operating desk according to FIG. 1 is well known in that part illustrated to the left of the dot-dash line. In this part, it contains a plurality of organ keys 1 through 7, which permit the selection of the photographic exposure values for a photograph or photographic series in an organ-programmed manner. In the example, the operating desk serves as an angio-photography installation for producing x-ray photographs in two planes in accord with the operational chart 8 with the help of two series film cameras. Further, it also contains indicator installations for the x-ray tube voltage and further magnitudes.

In the right hand part of the operating desk, according to FIG. 1, there are twelve program keys 9 through 20, to which an indicator field 21 is allocated, in which field the program allocated to each key is indicated. Further, an indicator field 22 for the program number, an indicator field 23 for the respective point in time present since program initiation, an indicator field 24 for the respective image frequency, and an indicator field 25 for the film supply are provided. A start key 26 and a stop key 27 are provided for program monitoring. For the selection of the program initiation, a zero key 28 is provided. A program is manually relayable by means of a feed key 29. Further, keys 30 through 41 with symbols for the selectable values and magnitudes are provided, said keys having two functions, namely the one being to indicate the respective value at the check-out of the selected program and the other being to freely program any desired program when key 20 is depressed. The freely programmed program is completely cancellable by means of cancel key 42. In order to cancel the respectively last freely input value, a cancel key 43 is provided.

When key 9 is pressed, then no automatic program cycle of a photographic series ensues. In this case, the physician actuates one of the organ keys 1 through 7 and selects the other values manually, in a manner not illustrated. If one of the constant given photographic programs is chosen that are selectable by means of keys 10 through 19, then one of those keys is pressed. In the sample embodiment, key 14 is depressed and, accordingly, the number 14 appears in the indicator field 22. The constant given (or predetermined) program assigned to key 14 can be checked out by actuating the start key 26. In field 23, the elapsed time of the program is now indicated in seconds and keys 30 through 41 light up, corresponding to the respectively set values. For purposes of control, this automatic program cycle can be arrested by depressing key 27. Further, a return to the point of start of the program is possible by pressing key 28. In this case, the indication zero appears in the indicator field 23 and the program cycle can begin anew.

By means of keys 30 through 41, only an examination of the respectively selected photographic program in successive steps is possible. So that the user can also examine the entire selected photographic program at a glance, an indicator field 60 is provided in the operating desk according to FIG. 1. This field 60 possesses a part 61 for display of the static photographic program, i.e., for those magnitudes that are statically set before the beginning of a photographic cycle, and a part 62 for display of the respective dynamic photographic program that cycles, in the example, in thirty steps in temporal succession. In the part 61 is indicated, for example by means of light-emitting diodes, which field of measurement of an x-ray exposure control, which focus of the x-ray tube, and which photographic system is selected. In the part 62 of the indicator field 60, the respectively selected magnitudes for each program step are indicated by means of light-emitting diodes. Thus, for example, it is indicated, for the first program step, that an individual picture in the frontal plane is being produced; for the second program step, that an injection of contrast agents ensues, etc.

Should the program selected by means of one of the keys 10 through 19 now in fact cycle, then a start switch 45 is taken in hand from a support-mount device 44 where it hangs and its button 46 actuated. The selected program now cycles automatically, i.e. first for example a contrast agent injection is automatically carried out (key 38 lights up), then a photograph series ensues spanning two seconds with an image frequency of two images per second (key 32 lights up), then a table displacement ensues, etc. The keys 30 through 41 then respectively light up.

When key 20 is actuated, then it is possible to input any random photographic program by means of the feed key 29. To this end, first the requisite values for the first program step (0. through 1. seconds) are input by means of the keys 30 through 41. Then the feed key 29 is actuated and the requisite values are again input for the second program step by means of keys 30 through 41, and so forth. In so doing, the cancel key 42 allows cancellation of the complete manually input program, whereas the cancel key 43 allows a cancellation of the last respective input program step.

Figure 2:
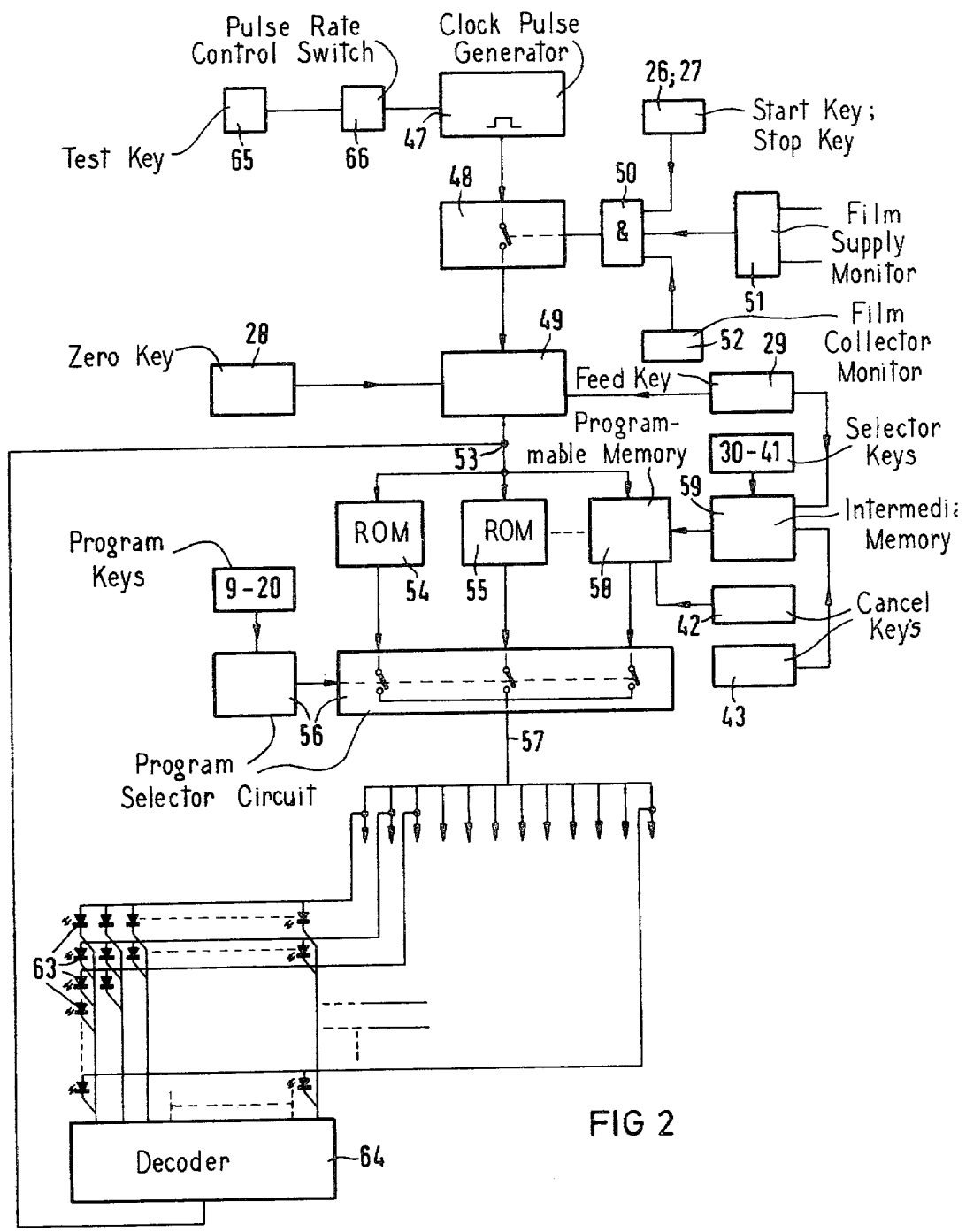
FIG. 2 is a circuit diagram of an x-ray diagnostic installation according to the invention.

In FIG. 2, a clock pulse generator 47 is illustrated, which supplies an output impulse per second to a gate circuit 48. The output of the gate circuit 48 is connected to a resettable pulse counter 49. The gate circuit 48 is actuated by an AND circuit 50, at whose inputs the keys 26 and 27 as well as a film supply monitoring installation 51 and a monitoring installation 52 for the collector cassette of the film camera are connected. When the start key 26 is pressed, if the requisite film supply is present and if the collector cassette is empty, then the AND circuit 50 closes the gate circuit 48 and the pulses of the clock pulse generator 47 are supplied to the pulse counter 49, i.e., the photographic program begins. The pulse counter 49 acts as an address register and delivers a signal at its output 53, which signal characterizes the respective step and is supplied in parallel to a plurality of read-only memories whose number is equal to the number of the program keys; in the sample embodiment this corresponds to ten program keys. The output information of the address counter 49, characterizing the respective step and hence the respective second of elapsed time, effects that all read-only memories 54, 55, etc., deliver signals at their outputs that fix the photographic values corresponding to the respective time step, thus for example the image frequency of the film camera, the table position, the focus of the x-ray tube, etc. Via a program selector circuit 56, only one of the read-only memories 54, 55, etc., is respectively connected to the output 57 that leads to component parts that are to be controlled. The program selector circuit 56 is connected to the program keys 9 through 20.

A freely programmable memory 58 is allocated to key 20, to which memory an intermediate memory 59 is preconnected. The memory 58 can be cancelled by means of cancel key 42, whereas the intermediate memory 59 can be cancelled by means of cancel key 43. The feed key 29 is likewise connected to the intermediate memory 59 and the address counter 49. Finally, the keys 30 through 41 are also connected to the intermediate memory 59.

For the free programming of the memory 58, the desired value combination is input into the intermediate memory 59 by means of the keys 30 through 41. When the feed key 29 is subsequently actuated, then the content of the intermediate memory 59 is shifted into the memory 58 and this content is relayed one step via the address counter 49. Subsequently, the next value combination assigned to the next program step can be input into the intermediate memory 59 by means of the keys 30 through 41. After actuation of the feed key 29, this value combination, too, is shifted into the memory 58, etc. The entire content of the memory 58 can be cancelled by actuating the cancel key 42, whereas the last respective input value combination can be cancelled by actuating the cancel switch 43.

It proceeds from FIG. 2 that light-emitting diodes 63 arranged in the indicator field 60 are connected in the form of a matrix to the output 57 of the program selection circuit 56. Thereby, the diodes 63 only serve for the display of the dynamic program; the display of the static program ensues in an analog manner. For the first program step of the dynamic program, the first column of the diode matrix is provided for the display of the engaged magnitudes, for the second program step the second column, etc. Therewith, the number of the light-emitting diodes 63 per program step is equal to the number of controllable magnitudes. In addition to being connected to the output 57 of the program selector circuit 56, the diodes 63 are connected via a decoder 64 to the output 53 of the address counter 49, which synchronizes the display in such a manner that the program information delivered by the selected memory appears at the right place in the diode matrix. The synchronization, thus, ensues indirectly by means of the clock pulse generator 47.

So that the user is under the impression that the entire program stored in the respectively selected memory is simultaneously displayed, a test key 65 is allocated to the clock pulse generator 47, which key effects an increase of the pulse generator frequency via a switch-over installation 66 to a value at which the program display, still proceeding step-by-step, merges for the user into the simultaneous display of all program steps. The key 65 is visible in FIG. 1 on the operating desk. Upon its actuation, the described display—simultaneous for the user—of the entire content of the selected program memory—thus also of the freely programmable memory 58 when this is selected—ensues in the indicator field 60.

In FIG. 2, only three memories 54, 55, 58 are indicated. Of course, eleven memories are present in the sample embodiment. This is indicated by the broken line.

It will be apparent that many modifications and variations may be effected without departing from the scope of the novel concepts and teachings of the present invention.

I claim as my invention:

1. An x-ray diagnostic installation for x-ray photographs comprising a program control device for the photographic cycle which comprises a resettable pulse counter, an electronic read-only memory for each photographic program whose input is connected to the resettable pulse counter, a clock pulse generator for actuating said pulse counter, so that each memory delivers program signals predetermined by its program that correspond to the output signals of the pulse counter, and a program selector circuit for connecting the outputs of all read-only memories to the component parts they control, characterized in that display means (63) for the content of the read-only memories (54, 55) are provided, which display means are connected to the output (57) of the program selector circuit (56) and whose display is synchronized by means of the clock pulse generator (47).

2. An installation according to claim 1, characterized in that the display means is located in an indicator field (60) and exhibits, for each program step, a plurality of electroluminescent display means (63) corresponding to the plurality of controllable magnitudes, which electroluminescent display means are controlled on the one hand by the clock pulse generator (47) and are connected on the other hand with the output (57) of the program selector circuit (56).

3. An installation according to claim 1, wherein, in addition to the read-only memories, a freely programmable memory for a freely programmable photographic program is present, characterized in that the freely programmable memory (58), too, is connectable to the display means (63).

4. An x-ray diagnostic installation for x-ray photographs comprising a program control device for the photographic cycle which comprises a resettable pulse counter, an electronic read-only memory for each photographic program whose input is connected to the resettable pulse counter, a clock pulse generator for actuating said pulse counter, so that each memory delivers program signals predetermined by its program that correspond to the output signals of the pulse counter, and a program selector circuit for connecting the outputs of all read-only memories to the component parts they control, characterized in that display means (63) for the content of the read-only memories (54, 55) are provided, which display means are connected to the output (57) of the program selector circuit (56) and whose display is synchronized by means of the clock pulse generator (47), and means for controlling the clock pulse generator (47) to operate at a pulse frequency providing a display of the entire contents of the respectively selected memory (54, 55) that is simultaneous for the eye of the user.

* * * * *